United States Patent [19]

Kishida

[11] Patent Number: 5,153,422
[45] Date of Patent: Oct. 6, 1992

[54] PHOTOSENSOR AND IMAGE SCANNER UTILIZING THE SAME

[75] Inventor: Yoshihiro Kishida, Kyoto, Japan

[73] Assignee: Dainippon Screen Mfg. Co., Ltd., Kyoto, Japan

[21] Appl. No.: 665,515

[22] Filed: Mar. 5, 1991

[30] Foreign Application Priority Data

Mar. 15, 1990 [JP] Japan .................................. 2-67850

[51] Int. Cl.$^5$ .................. H01L 27/14; H01L 31/0232
[52] U.S. Cl. ................................. 250/208.1; 250/235; 250/236; 357/30; 358/494
[58] Field of Search ...................... 250/236, 235, 208.1; 358/494; 357/30 L, 30 H, 30 D

[56] References Cited

U.S. PATENT DOCUMENTS

| | | | |
|---|---|---|---|
| 4,214,157 | 7/1980 | Check, Jr. et al. | 250/236 |
| 4,661,699 | 4/1987 | Welmers et al. | 250/235 |
| 4,837,588 | 6/1989 | Imakawa et al. | 346/108 |
| 4,882,490 | 11/1989 | Takasaki et al. | 250/236 |

FOREIGN PATENT DOCUMENTS

| | | | |
|---|---|---|---|
| 57-145368 | 9/1982 | Japan | 357/30 L |
| 58-207767 | 12/1983 | Japan | 358/494 |
| 63-278020 | 11/1988 | Japan . | |

*Primary Examiner*—Constantine Hannaher
*Attorney, Agent, or Firm*—Lowe, Price, LeBlanc & Becker

[57] ABSTRACT

A photosensor (20a) has a pair of n-type semiconductor layers (21U, 21D) formed on the major surface of a p-type semiconductor substrate (31). A light-shielding pattern (24) comprised of unit light-shielding layers (33) is formed on the major surface of the substrate. When the major surface is scanned by a light beam in the direction ($D_X$) in which the unit light-shielding layers are aligned, a couple of photo-conversion signals indicating a current position of the light beam on the photosensor are generated in the photosensor. Since the light-shielding pattern is directly provided on the sensor body, no grating glass is required other than the photosensor.

18 Claims, 12 Drawing Sheets

PHOTOSENSOR AND IMAGE SCANNER UTILIZING THE SAME

BACKGROUND OF THE INVENTION

1. Field of the Invention

The present invention relates to a photosensor employed for monitoring a scanning position of a light beam, and an image scanner in which an image is read or recorded under scanning control using the photosensor.

2. Description of Prior Arts

In a process scanner of flat bed type and the like, it is necessary to periodically deflect a light beam along a main scanning direction for reading or recording an image. A rotating or oscillating light deflector, such as a polygon mirror, a galvano mirror, a hologram disk or the like, is employed for such periodic deflection.

However, a locus of a light beam which is deflected by such a light deflector does not necessarily define a complete straight line on a scanned plane, but is curved in a configuration specific to the light deflector. For example, in the case of a polygon mirror, it is known that such curvature is caused by surface inclination of mirror surfaces, and such curvature must be corrected so that the locus of the light beam defines a straight line. Similarly, wobbling correction is required in the case of a galvano mirror, and scanbow correction in the case of a hologram disk.

As a technique for performing such correction, U.S. Pat. No. 4,661,699 discloses an apparatus for detecting a reference light beam which is deflected together with a main light beam by a photosensor, and compensating for projection deviation of the main light beam to a subscanning direction on the basis of a photoelectric conversion output of this photosensor. This photosensor is formed by pasting a glass member provided with a stripe light shielding pattern on a major surface of a long photoelectric conversion element, the glass member is called a grating glass member. Unit patterns forming the stripes have tapered portions, so that an output waveform from the photoelectric conversion element is changed in response to the value of projection deviation of the light beam in the subscanning direction. The scanning positions of the main light beam and the reference light beam in the subscanning direction are changed in response to the output waveform, thereby correcting the projection deviation.

On the other hand, Japanese Patent Laying-Open Gazette No. 63-278020 discloses a technique of arranging two independent photosensors in parallel with each other for receiving a reference light beam, and correcting projection deviation of a light beam on the basis of photoelectric conversion signals thereof.

However, in the photosensor disclosed in U.S. Pat. No. 4,661,699, it is not easy to manufacture the grating glass member employed therefor, and the manufacturing cost is considerably increased as the result. Such a tendency is remarkable particularly since the specific patterns having tapered portions are required.

In the technique described in Japanese Patent Laying-Open Gazette No. 63-278020, on the other hand, the two independent photosensors must be rendered adjacent to each other with a uniform space in the subscanning direction, and hence it is difficult to adjust relative positions in integration of these photosensors.

SUMMARY OF THE INVENTION

The present invention is directed to a photosensor employable for detecting a scanning position of a light beam.

According to the present invention, the photosensor comprises: (a) a first conductivity type first semiconductor layer having a major surface defined by first and second directions and extending along the first direction in the form of a strip, wherein the first direction corresponds to a scanning direction of the light beam and the second direction is perpendicular to the first direction; (b) a pair of second conductivity type second semiconductor layers formed in the major surfaces along the first direction in the form a strips respectively, and being adjacent to each other in the second direction; and (c) a light shielding pattern provided on the major surface and comprising unit light-shielding layers each of which is strip-shaped and extends along the second direction and which are periodically arranged along the first direction with gaps therebetween and selectively cover the pair of second semiconductor layers.

The first and second photoelectric conversion signals indicating the scanning position of the light beam are obtained from first and second p-n junctions defined between the first semiconductor layer and respective ones of the pair of second semiconductor layers when the major surface is scanned by the light beam.

Preferably, each of the gaps has a same width as each of the unit light-shielding layers in the first direction. The width of each unit light-shielding layer may be substantially equal to a diameter of the light beam on the major surface.

In an aspect of the present invention, a plurality of photosensors each of which has the above-indicated structure are aligned on a base plate. Even if the scanning range of the light beam is large, positions of the light beam are deviations thereof from a reference position can be detected. The reference position is defined between the pair of the second semiconductor layers.

In the photosensor according to the present invention, a pair of p-n junctions, which are in the form of stripes respectively, are arrayed on a major surface of a common semiconductor layer (the first semiconductor layer). Two signals obtained by photoelectrically converting a light beam which is introduced from clearances of a light shielding pattern by the respective p-n junctions include information related to an incident position of the light beam. Namely, respective time changes of the two signals express scanning positions of the light beam in a first direction, while difference between the two signals expresses projection deviation of the light beam in a second direction. Thus, scan timing of the light beam in the first direction (the main scanning direction) is monitored on the basis of these signals, while projection deviation of the light beam in the second direction (the subscanning direction) can be corrected in response to the aforementioned difference.

Since the light shielding pattern in this photosensor is directly formed on a semiconductor laminated structure forming a sensor body, it is not necessary to separately prepare a grating glass member having a specific pattern. Unit light shielding layers forming the light shielding pattern are in the form of simple strips, and are easy to form. Further, it is not necessary to arrange a plurality of photosensors in parallel, whereby no position control of high accuracy is required in integration into a required device.

The photosensor array may be employed in an image scanner in order to correct deviations in light beam deflection. The image scanner is operable to periodically scan an object surface with a main light beam in a prescribed main scanning direction and to relatively move the scanned surface and the main light beam along a subscanning direction, thereby performing image recording on the object surface or image reading from the object surface.

According to the present invention, the image scanner comprises: (a) light beam emission means for emitting the main light beam while emitting a reference light beam being parallel to the main light beam; (b) a predeflector interposed in optical paths of the main and reference light beams for deflecting the main and reference light beams in a pre-deflecting direction being conjugate with the subscanning direction in response to a control signal; (c) a main deflector for receiving the main and reference light beams after deflection by the predeflector and for periodically deflecting the main and reference light beams in a main deflecting direction being conjugate with the main scanning direction; (d) means for relatively changing respective travelling directions of the main and reference light beams after deflected by the main deflector, thereby guiding only the main light beam onto the scanned surface; (e) a photosensor array formed by linearly arraying photosensors in a first direction conjugate with the main deflecting direction and located at a position capable of receiving the reference light beam, each of the photosensors having the above-indicated construction; (f) means for summing up respective first photoelectric conversion signals obtained in the photosensors to generate a first composite signal; (g) means for summing up respective second photoelectric conversion signals obtained in the photosensors to generate a second composite signal; and (h) a feedback loop means for receiving the first and second composite signals to generate a feedback signal and a timing signal.

The feedback signal is responsive to differences between the first and second composite signals and delivered to the predeflector as the control signal. On the other hand, the timing signal is used to determine a timing of image recording or image reading by the main light beam on the object surface.

The number of the photosensors included in the array is determined in accordance with the scanning range of a reference light beam in a position of arrangement of the photosensor array etc. As compared with the case of the prior art arranging a plurality of photosensors in parallel, assembly control is easy in the case of arraying the photosensors along its longitudinal. This is because space control may be performed only in short edge sides of the photosensors in the case of serial array along the longitudinal direction, although photosensors must be arranged with constant spaces entirely along the longitudinal direction in the case of parallel arrangement.

Accordingly, an object of the present invention is to provide a photosensor for detecting a scanning position which is manufactured at a low cost and requires no built-in position control of high accuracy.

Another object of the present invention is to provide an image scanner which is structured to correct projection deviation of a light beam by utilizing the photosensor.

These and other objects, features, aspects and advantages of the present invention will become more apparent from the following detailed description of the present invention when taken in conjunction with the accompanying drawings.

DESCRIPTION OF PREFERRED EMBODIMENTS

A. Overall Structure

Figure 2:
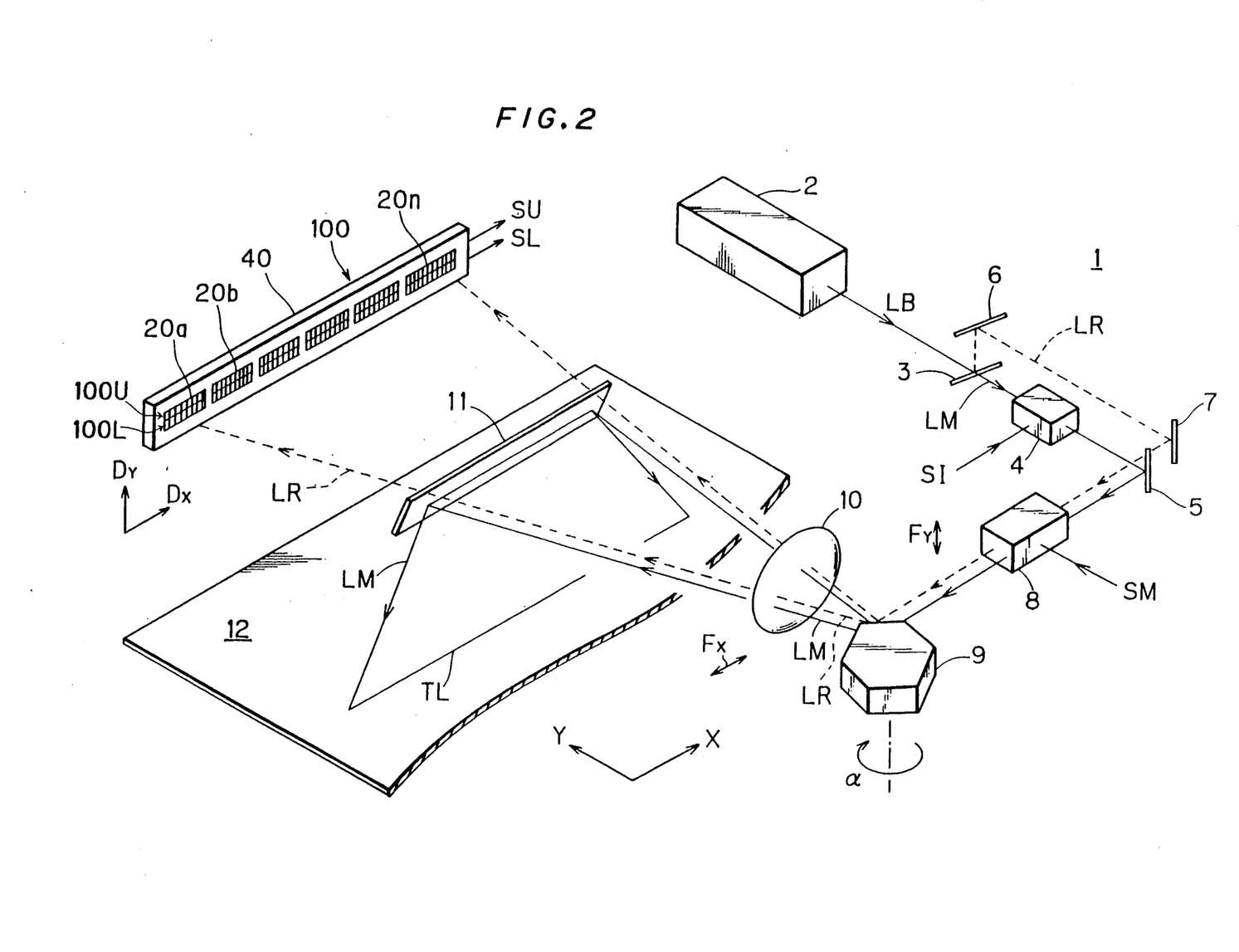
FIG. 2 is a block diagram showing an image scan recorder in which the photosensor according to the present invention is employed.

FIG. 2 illustrates the overall structure of an image scan recorder 1 according to a preferred embodiment of the present invention. This image scan recorder 1 defines a process scanner of a flat bed type which comprises a polygon mirror 9 as a main deflector. Symbols X and Y shown in FIG. 2 denote a main scanning direction and a subscanning direction in an image scanning for recording an image, respectively.

A laser beam LB emitted from a laser source 2 is divided into a main light beam LM and a reference light beam LR by a half mirror 3. An acousto-optical modulator (AOM) 4, which is controlled by an image signal SI, is arranged in an optical path of the main light beam LM, os that the main light beam LM is ON-OFF modulated by the AOM 4. The modulated main light beam LM is reflected by a mirror 5, and thereafter incident upon an acousto-optical deflector (AOD) 8 serving as a predeflector.

On the other hand, the reference light beam LR is successively reflected by mirrors 6 and 7 to bypass the AOM 4, and enters the AOD 8 as a beam which is parallel to the main light beam LM. The AOD 8, which is supplied with a beam deviation signal SM as described later, deflects the light beams LM and LR in a direction F$y$ in response to the signal SM. The direction F$y$ is optically conjugate with the subscanning direction Y, and the light beams LM and LR are deflected substantially at the same angle. In the present invention, a term "conjugate directions" is used to indicate directions which are optically equivalent to each other on travelling paths of light beams.

The light beams LM and LR deflected by the AOD 8 enter a polygon mirror 9, which rotates in a direction α at a constant velocity. Consequently, the light beams LM and LR are periodically deflected in a direction F$x$ following rotation of the polygon mirror 9. The direction $F_X$ is optically conjugate with the main scanning direction X.

In the deflected light beams LM and LR, the main light beam LM passes through a lens 10 and is thereafter reflected by a mirror 11 toward a photosensitive material 12. Following rotation of the polygon mirror 9, therefore, the main light beam LM scans the photosensitive material 12 along the main scanning direction X, to selectively expose its surface. A locus TL of this scanning defines a scanning line in image recording. The photosensitive material 12 is relatively moved by a moving mechanism (not shown) in the subscanning direction Y with respect to the main light beam LM, whereby a two-dimensional image which is responsive to the image signal SI is recorded on the photosensitive material 12 as a latent image.

On the other hand, the reference light beam LR deflected by the polygon mirror 9 passes through the lens 10, and is thereafter incident upon a photosensor array 100. This photosensor array 100 is formed by linearly aligning and fixing a plurality of (e.g., six) photosensors $20a, 20b, \ldots, 20n$ on a long insulating substrate 40. The photosensor array 100 is so arranged that its enlongated direction conjugate and cross direction $D_Y$ are optically conjugate with the main scanning direction X and the subscanning direction Y respectively. In other words, the photosensor array 100 is arranged in a position which is conjugate with respect to the locus TL of the main light beam LM on the photosensitive material 12.

As hereinafter described in detail, each of the photosensors $20a$ to $20n$ has an upper sensor and a lower sensor which are arrayed in parallel with each other. The respective upper sensors of the photosensors $20a$ to $20n$ are electrically interconnected to form an upper sensor array 100U. The respective lower sensors of the photosensors $20a$ to $20n$ are also electrically interconnected to form a lower sensor array 100L. The reference light beam LR which is received by the photosensor array 100 is photoelectrically converted by the upper and lower sensor arrays 100U and 100U, and the converted signals are outputted as a couple of photoelectric conversion signals SU and SL.

Figure 3:
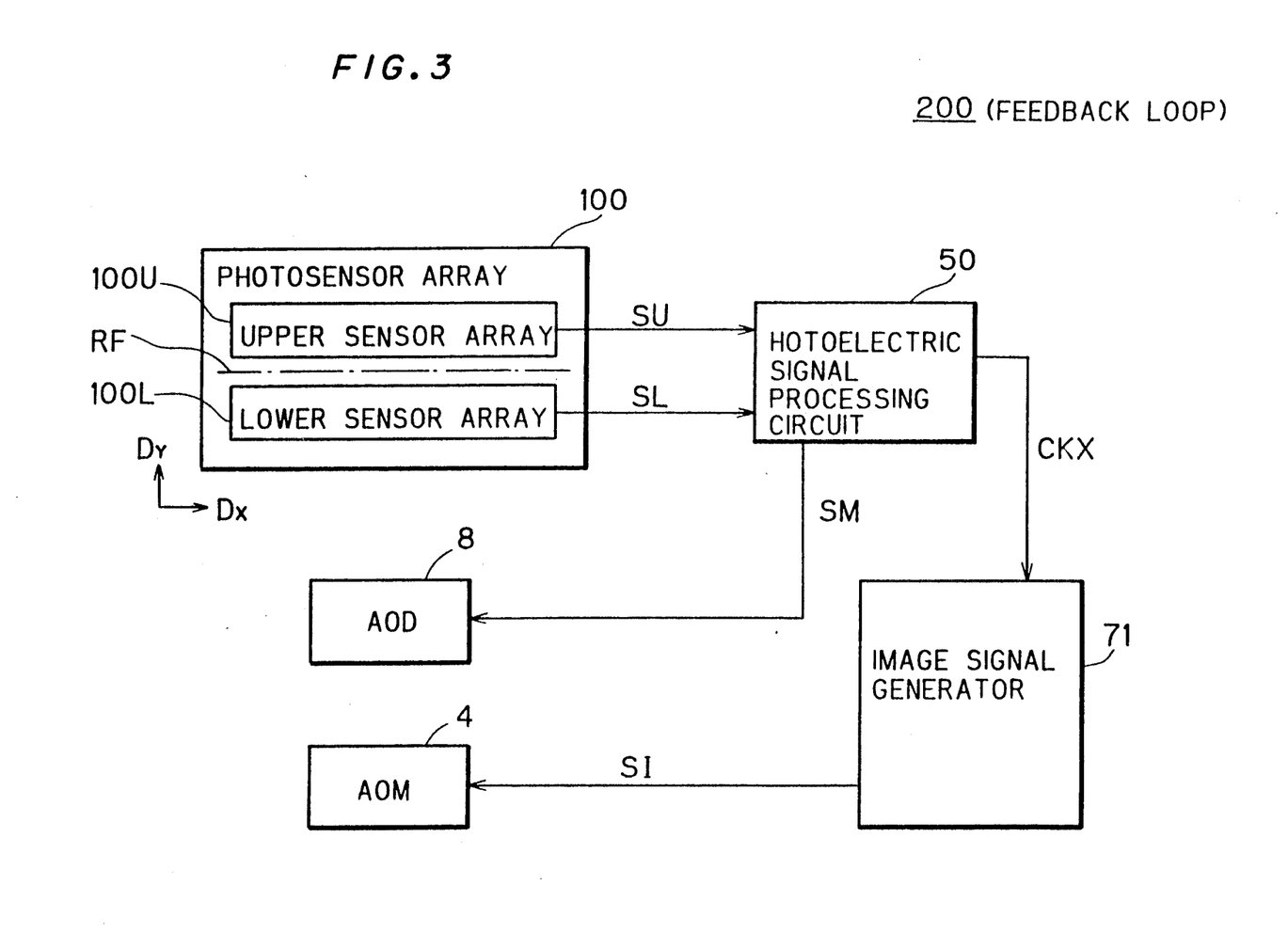
FIG. 3 is a block diagram showing a feedback control system in the apparatus shown in FIG. 2.

FIG. 3 is a block diagram showing a feedback loop or closed loop controller 200 for performing modulation timing control in the AOM 4 and deflection control in the AOD 8 on the basis of the signals SU and SL. The signals SU and SL outputted from the upper and lower sensor arrays 100U and 100L are delivered to a photoelectric signal processing circuit 50. This processing circuit 50 generates a main scanning synchronizing clock (or grating clock) CKX and a beam deviation signal SM through signal processing as described later. The beam deviation signal SM is adapted to indicate how much an incident position of the reference light beam LR on the photosensor array 100 deviates from a reference line RF defined on the boundary between the upper and lower sensor arrays 100U and 100L. Further, since the direction and amount of deflection in the polygon mirror 9 are substantially identical in the reference light beam LR and the main light beam LM, the beam deviation signal SM substantially expresses the amount of deflection of the main light beam LM on the photosensitive material 12 in the subscanning direction Y. Deflection of the light beams LM and LR in these directions Y and $D_Y$ is mainly caused by surface inclination of the polygon mirror 9.

The beam deviation signal SM is supplied to the AOD 8 as a deflection control signal. The amounts of deflection of the light beams LM and LR in the AOD 8 are changed by the beam deviation signal SM, whereby the light beams LM and LR are controlled to regularly draw linear loci. Namely, deviations of projected positions of the light beams LM and LR in the subscanning direction Y and $D_Y$ caused by surface inclination of the polygon mirror 9 are compensated for by driving of the AOD 8 based on the beam deviation signal SM.

On the other hand, the main scanning synchronizing clock CKX is supplied to an image signals generator 71. This image signal generator 71 may be adapted to perform prescribed processing on an image signal obtained by reading an original and outputting the same, or to successively read image signals previously stored in an image memory. An image signal SI which is generated in the form of a halftone dot signal in this image signal generator 71 is transmitted to the AOM 4 at timing defined by the main scanning synchronizing clock CKX every pixel. The AOM 4 ON/OFF-modulates the main light beam LM in response to the level of the image signal SI.

B. Photosensor Array 100

Figure 1:
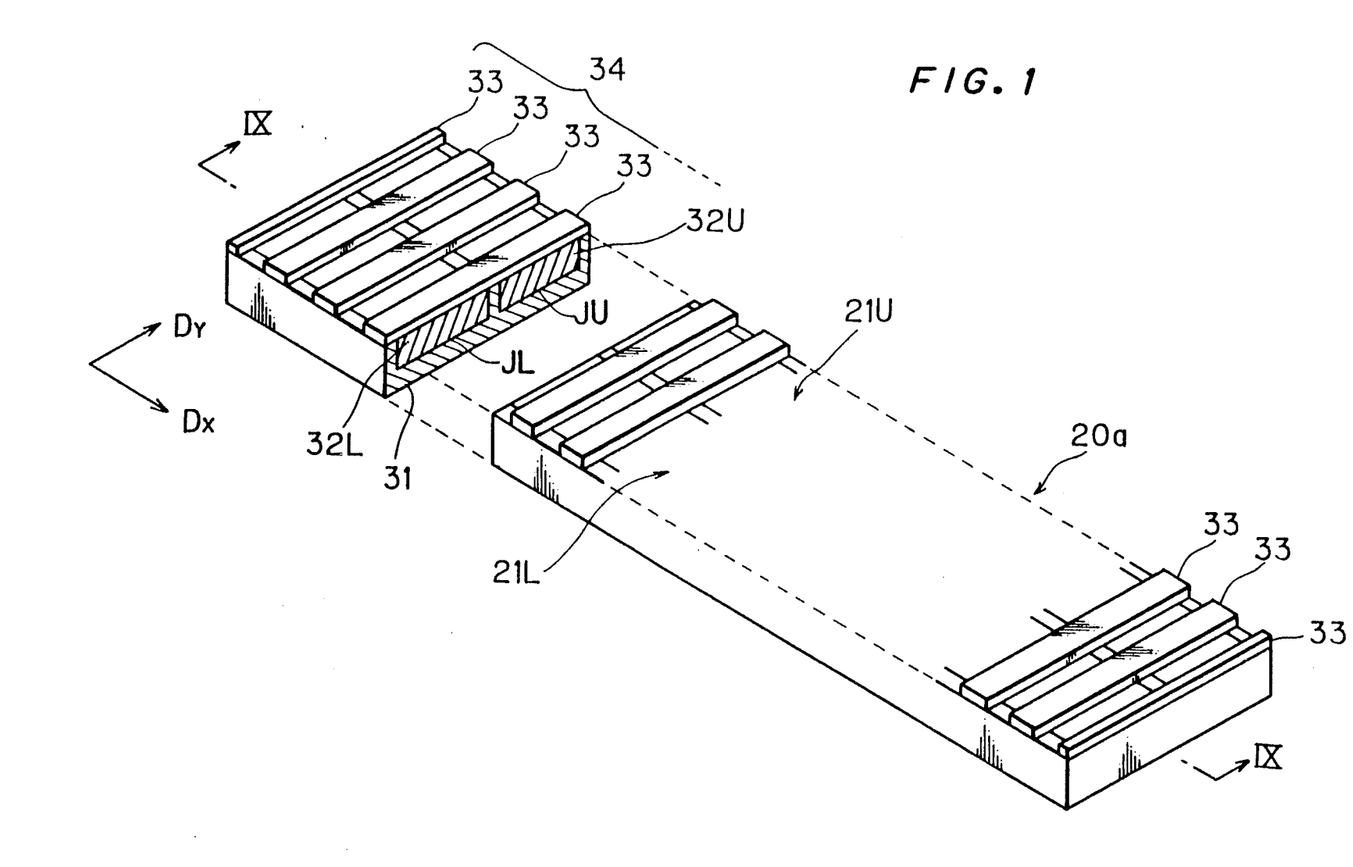
FIG. 1 is a partially fragmented perspective view showing a photosensor according to a preferred embodiment of the present invention.

FIG. 1 is a partially fragmented perspective view showing the structure of the photosensor 20a which is included in the photosensor array. Since the remaining photosensors 20b to 20n also have similar structures, only the photosensor 20a is now described.

The photosensor 20a has a strip-shaped p-type semiconductor substrate 31 which extends in a direction $D_X$. The major surface of the semiconductor substrate 31 is parallel to a plane which is defined by the direction $D_X$ and $D_Y$. A pair of n-type semiconductor layers 32U and 32L are formed on this major surface. The n-type semiconductor layers 32U and 32L are in the form of strip-shaped wells extending in the direction $D_X$, which are adjacent to each other at a small interval in the direction $D_Y$. A pair of p-n junction regions JU and JL are defined in respective contact interfaces between the n-type semiconductor layers 32U and 32L and the p-type semiconductor substrate 31. Alternatively, the semiconductor layers 32U and 32L may be formed of a p-type semiconductor material in the case where the semiconductor substrate 31 is formed by an n-type substrate.

The p-n junction regions JU and JL are adapted to photoelectrically convert light which enters from above in FIG. 1. Thus, the photosensor 20a comprises a pair of partial photosensors 21U and 21L which extend in the direction $D_X$ respectively. These partial sensors 21U and 21L, which are vertically arrayed in the positional relation shown in FIG. 2, are called upper and lower sensors respectively.

A large number of unit light shielding layers 33 are arrayed above and over the n-type semiconductor layers 32U and 32L. The unit light shielding layers 33 are in the form of linear strips extending in the direction $D_Y$, which are periodically arrayed along the direction $D_X$ to define a light shielding pattern (grating pattern) 34 as a whole. The light shielding pattern 34 is formed of aluminum, for example. A method of manufacturing the photosensor 20a is hereinafter described.

Figure 4A:
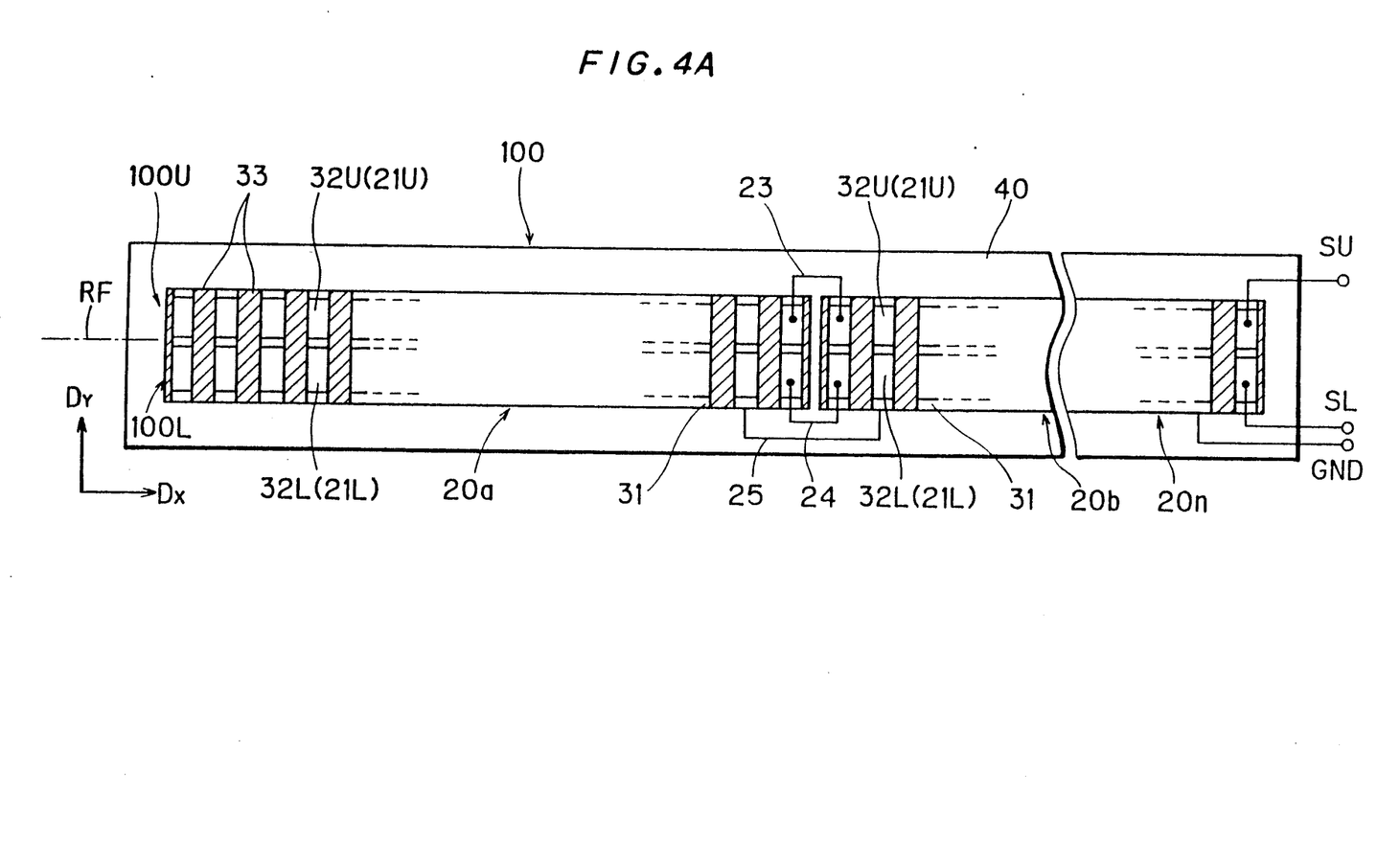
FIG. 4A is a front elevational view of a photosensor array.

FIG. 4A is a front elevational view showing the photosensor array 100. The plurality of photosensors 20a to 20n, each having the aforementioned structure, are arrayed on an insulating substrate 40 in the direction $D_X$. The n-type semiconductor layers 32U of the respective photosensors 20a to 20n are interconnected by electric wirings 32 which are typically shown in FIG.

4A, so that a first photoelectric conversion signal SU is taken out. Similarly, the other n-type semiconductor layers 32L of the respective photosensors 20a to 20n are interconnected by other wirings 24, so that a second photoelectric conversion signal SL is taken out. Further, the p-type semiconductor substrates 31 of the photosensors 20a to 20n are interconnected by wirings 25 or a printed metal layer provided on the surface of the insulated substrate 40, to be at a ground level GND.

The photosensors 20a to 20n are so linearly aligned as to define the upper sensor array 100U as a set of the upper sensors 21U and the lower sensor array 100L as a set of the lower sensors 21L. The reference line RF, which is an imaginary line, is defined along the boundary portion between the upper and lower sensor arrays 100U and 100L.

Figure 4B:
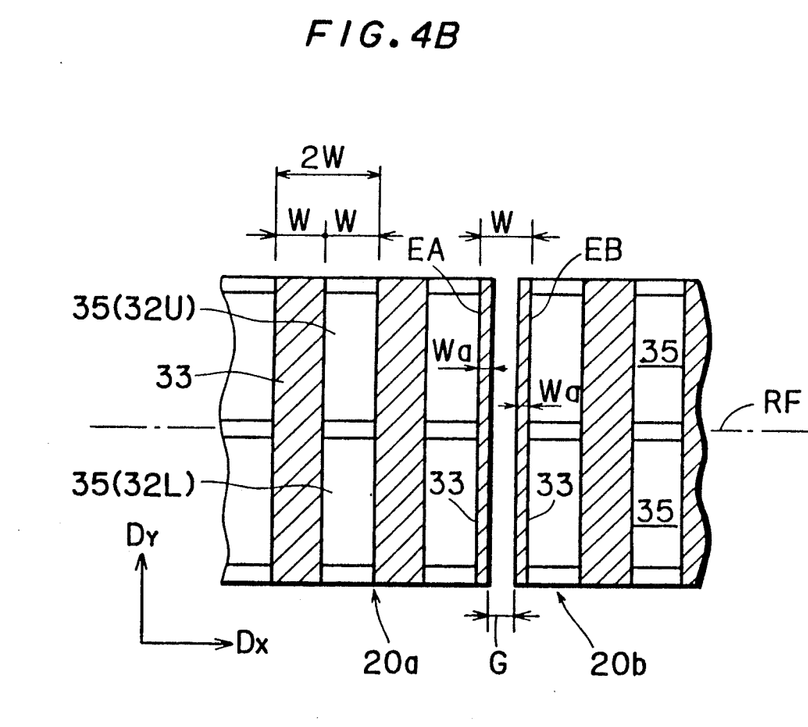
FIG. 4B is an enlarged view of an array boundary between photosensors in the photosensor array.

FIG. 4B is an enlarged view showing a boundary portion between the photosensors 20a and 20b, which are adjacent to each other. Each of the unit light shielding layers 33, except for those provided at the ends of the photosensor 20a, has a prescribed width W in the direction $D_X$, and slit-type windows 35 provided between the adjacent unit light shielding layers 33 also have the same width W. The width W is at about the same value as the beam diameter of the reference light beam LR in the position of the photosensor array 100. Each of the two unit light shielding layers 33 provided at the ends of the photosensor 20a has a width $W_a$ smaller than the width W. An array gap G between the photosensors 20a and 20b is determined so that a distance between inner edges EA and EB of the unit light shielding layers 33 facing each other through the gap G coincides with the aforementioned width W. In other words, the following equation holds:

$$2W_a + G = W$$

Thus, array of the windows 35 in the photosensor 20a is aligned in space with that of the windows 35 in the adjacent photosensor 20b.

Such arrangement relation also applies to the remaining photosensors 20b to 20n. Thus, the windows 35 are arrayed in a same period (grating pitch) 2W throughout the overall photosensors 20a to 20n. Since the spatial adjustment of the photosensors 20a to 20n is attained only by adjusting the array gap of the photosensors 20a to 20n along the short sides of the photosensors, i.e., along the direction $D_Y$, an operation for such adjustment is relatively simple as compared with the case where a plurality of photosensors are arranged in parallel in the direction $D_Y$.

The length of the photosensor array 100 along the direction $D_X$ is determined in proportion to the scanning range of the reference light beam LR along the direction $D_X$ at the position of the array 100. Since each of the photosensors 20a to 20n cannot have a length larger than the diameter of a semiconductor wafer employed for fabrication thereof, a sensing range corresponding to the aforementioned scanning range is ensured by forming the array of the plurality of photosensors 20a to 20n. Thus, the total number of the photosensors 20a to 20n which are included in the photosensor array 100 is determined by the ratio of the aforementioned scanning range to the length of each photosensor.

Figure 5A:
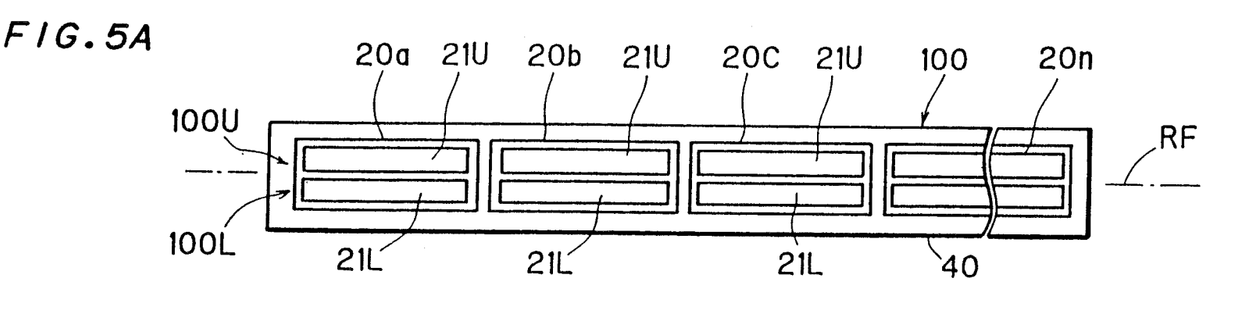
FIG. 5A is a typical front elevational view of the photosensor array.
Figure 5B:
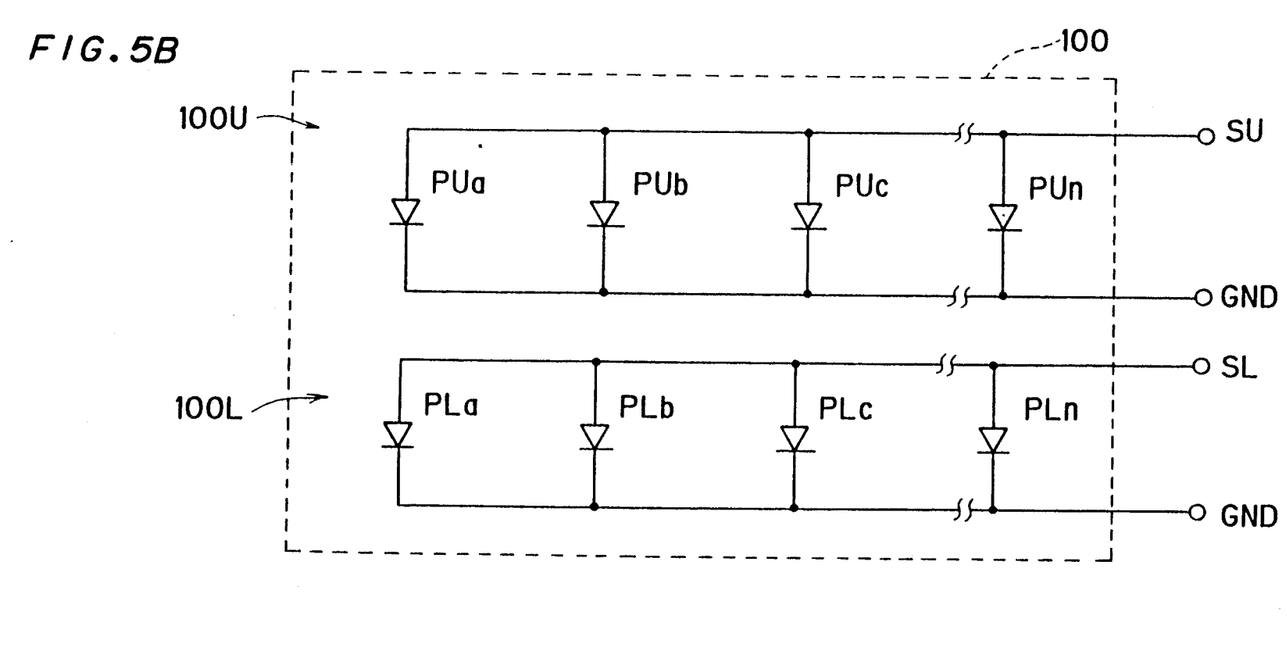
FIG. 5B is an equivalent circuit diagram of the photosensor array, FIGS. 6A and 6B as combined with each other shows a circuit diagram of a photoelectric signal processing circuit.

FIG. 5 is a typical front elevational view of the photosensor array 100, and FIG. 5B is an equivalent circuit diagram of the photosensor array 100 which is drawn in correspondence to FIG. 5A. The light shielding pattern is omitted from FIG. 5A. Since the respective ones of the upper and lower sensors 21U and 21L have photoelectric conversion functions, the upper sensor array 100U is equivalent to parallel connection of photodiodes $PU_a$ to $PU_n$, and the lower sensor array 100L is equivalent to parallel connection of photodiodes $PL_a$ to $PL_n$. A composite output of the upper photodiodes $PU_a$ to $PU_n$ are taken out as the signal SU, while a composite output of the lower photodiodes $PL_a$ to $PL_n$ is taken out as the signal SL. Considering an upper photodiode (e.g., $PU_a$) and a lower photodiode (e.g., $PL_a$) corresponding thereto in an actual device structure, the p-type semiconductor substrate 31 shown in FIG. 1 serves as an anode region which is common thereto, and hence there is no need to provide two ground wires as shown in FIG. 5B, but one ground line shown in FIG. 4A is sufficient.

C. Photoelectric Signal Processing Circuit 50

Figure 6A:
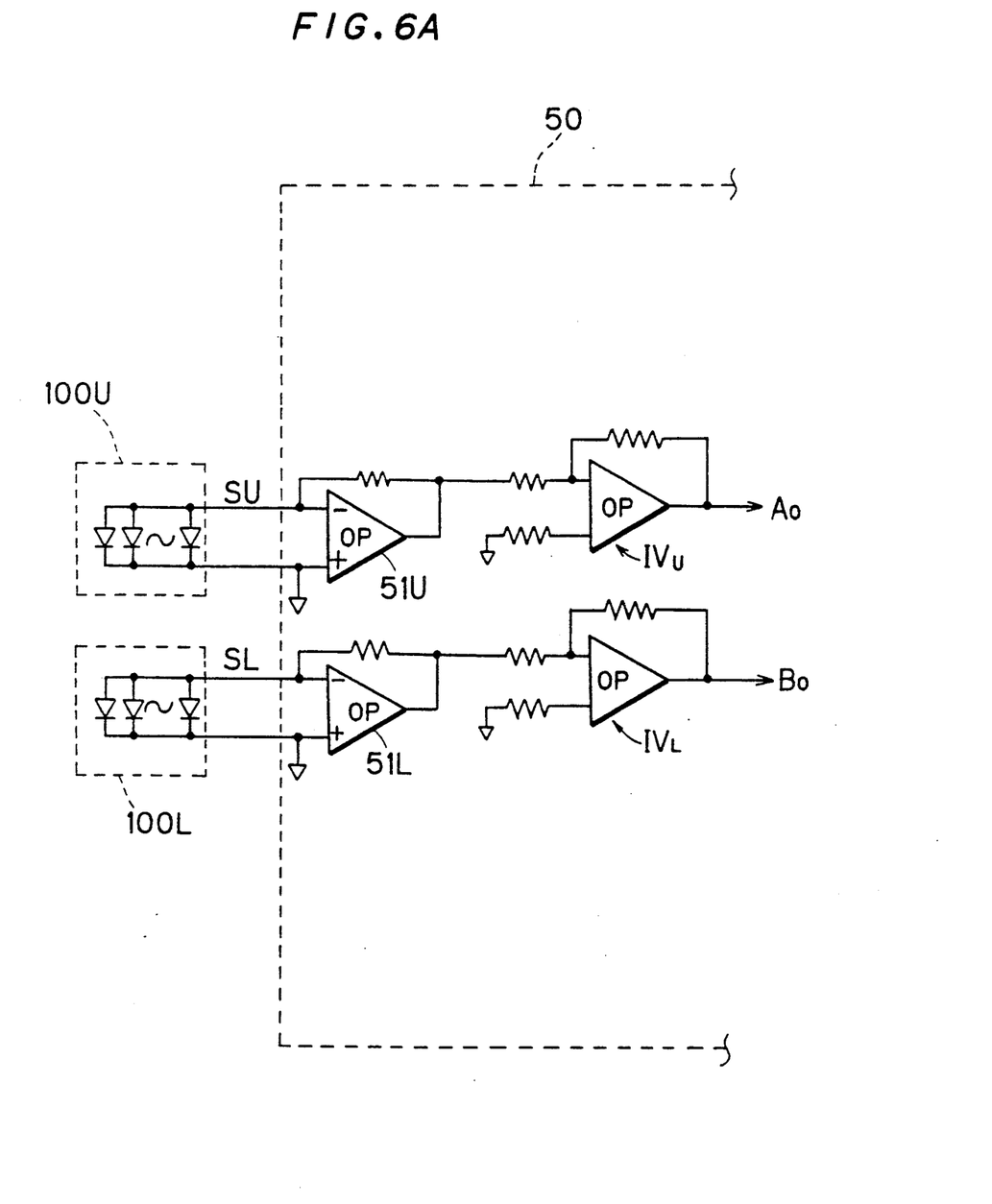
Figure 6B:
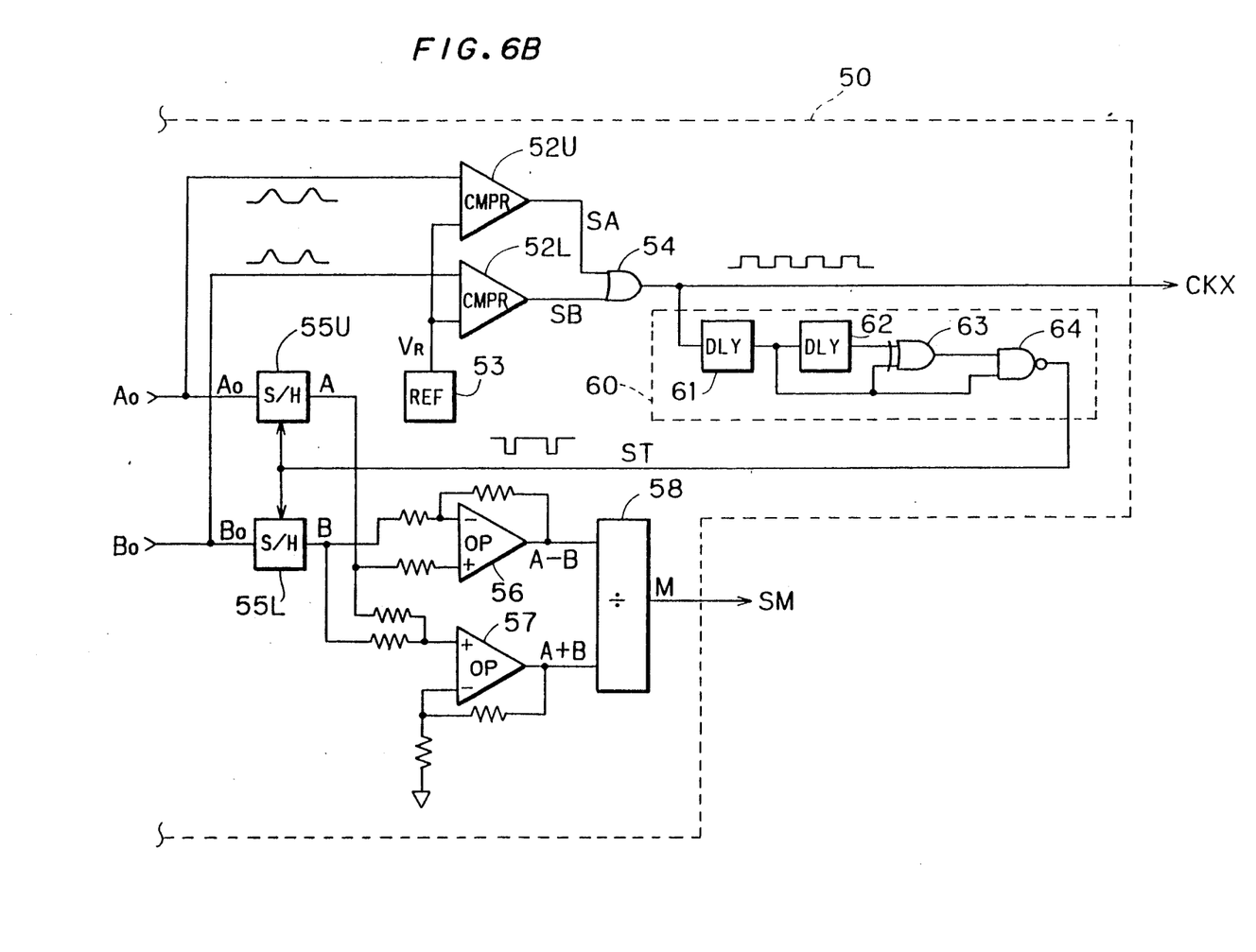

FIG. 6A as combined with FIG. 6B is a circuit diagram showing the photoelectric signal processing circuit 50. The photoelectric conversion signals SU and SL from the upper and lower sensor arrays 100U and 100L are subjected to current-to-voltage conversion by operational amplifiers 51U and 51L and inversion buffers $IV_U$ and $IV_L$ respectively. Voltage signals $A_0$ and $B_0$ thus obtained are inputted in comparators 52U and 52L respectively. A prescribed reference voltage $V_R$ from a reference voltage generator 53 is supplied as other inputs of the comparators 52U and 52L.

Figure 7:
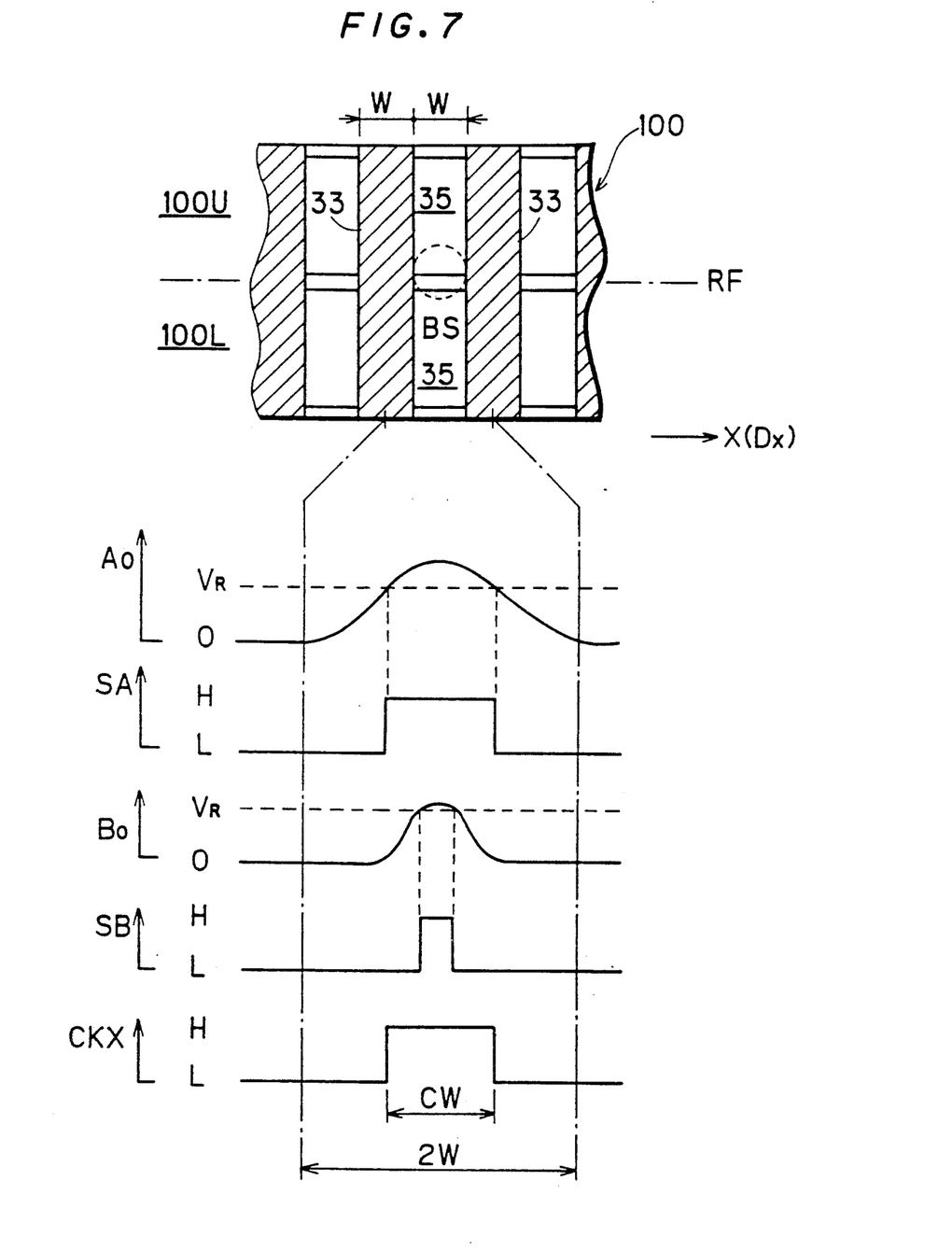
FIGS. 7, 8A and 8B are operation waveform diagrams of the photoelectric signal processing circuit.

FIG. 7 illustrates waveforms at respective parts of the photoelectric signal processing circuit 50 for respective scanning positions of a beam spot BS in the direction $D_X$ which is projected onto the photosensor array 100 by the reference light beam LR. As shown by one-dot chain lines, scales of the respective waveforms along the direction $D_X$ are enlarged as compared with those on the photosensor array 100. FIG. 7 illustrates the case where the central position of the beam spot BS upwardly deviates from the reference line RF.

Due to the upward deviation of the beam spot BS, the signal $A_0$ obtained from the upper sensor array 100U when the beam spot BS passes through the windows 35 forms a wide peak. On the other hand, the signal $B_0$ obtained from the lower sensor array 100L forms a narrow peak. The comparators 52U and 52L compare these signals $A_0$ and $B_0$ with the common reference voltage $V_R$, and output the results of comparison as binarized signals SA and SB respectively. Within the signals whose waveform is thus binarized, the signal SA is a wide binary pulse, and the signal SB is a narrow binary pulse.

A next-stage OR gate 54 calculates the logical sum of these signals SA and SB, and outputs the same as the main scanning synchronizing clock CKX. As understood from FIG. 7, the clock CKX has the same waveform as the signal SA when the beam spot BS in an upwardly deviating state. When the beam spot BS is in a downwardly deviating state, on the other hand, obtained is a set of waveforms in which the waveforms of the signals $A_0$ and $B_0$ shown in FIG. 7 are replaced with each other and those of the signals SA and SB are also replaced with each other. In this case, therefore, the clock CKX has the same waveform as the signal SB. When the center of the beam spot BS is on the reference line RF, further, the signals $A_0$ and $B_0$ have substantially identical waveforms, and a clock CKX is obtained by binarization of the common waveform.

Namely, the one of the signals SA and SB having a larger pulse width is substantially utilized as the clock CKX. It is possible to set the pulse width CW of the clock CKX at about 50% of the light shielding pattern cycle period 2W in terms of distance by adjusting the value of the reference voltage $V_R$. Thus, the clock CKX becomes a pulse train having a duty ratio 1/2.

Figure 8A:
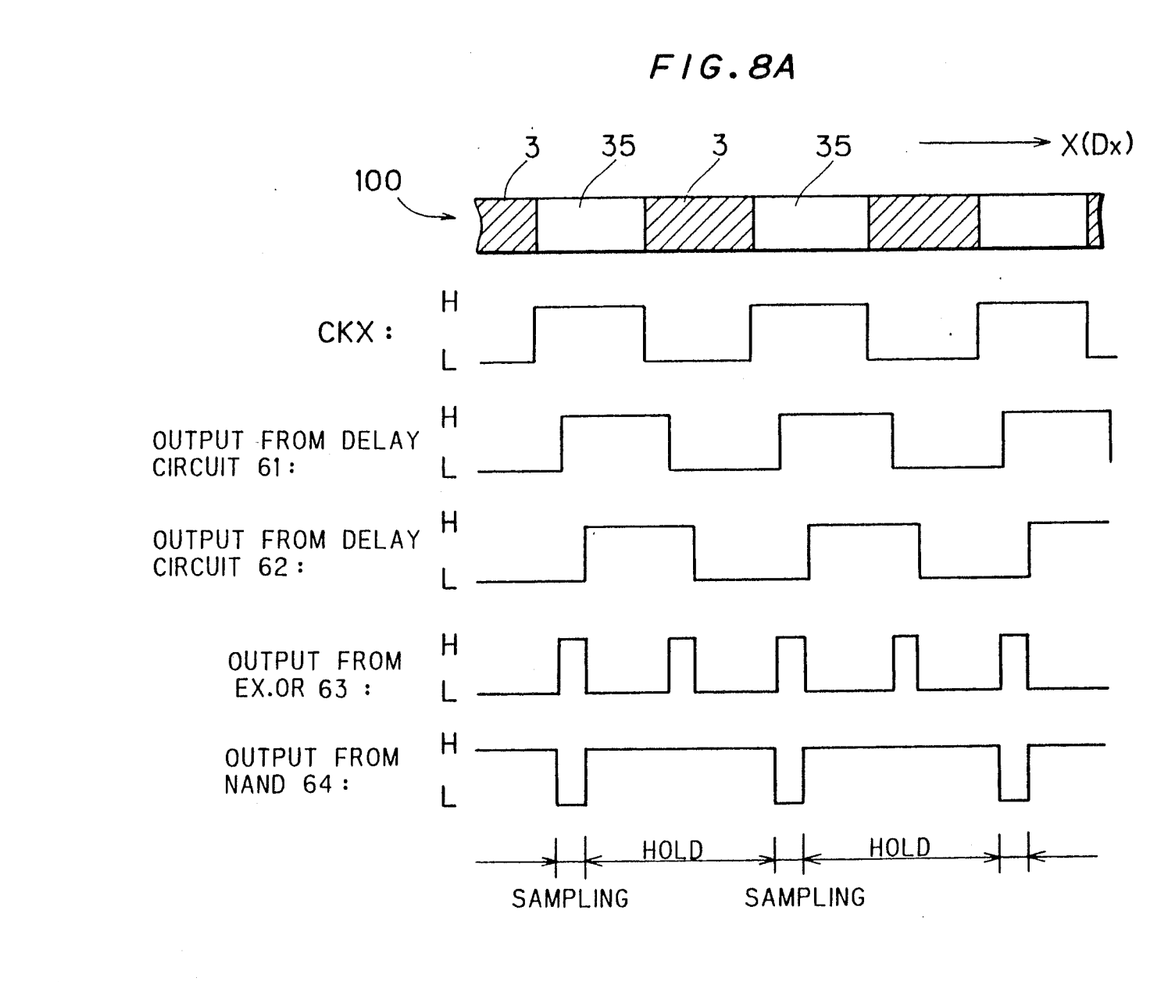

The main scanning synchronizing clock CKX is supplied to the image signal generator 71 shown in FIG. 3, as well as to a timing generation circuit 60 shown in FIG. 6B. The clock CKX is subjected to a two-stage delay at delay circuits 61 and 62 of a two-stage structure provided in the timing generation circuit 60 (see FIG. 8A). A pulse train ST shown in the lower part of FIG. 8A is obtained by an exclusive OR gate 63 and a NAND gate 64 which are provided on a rear stage side thereof. This pulse train ST is a signal which forms a negative peak once every period when the reference light beam LR is projected into each window 35 of the photosensor array 100. It is possible to generate the negative peak in the pulse train ST at the center of the window 35, by adjusting the delay times in the delay circuits 61 and 62.

Figure 8B:
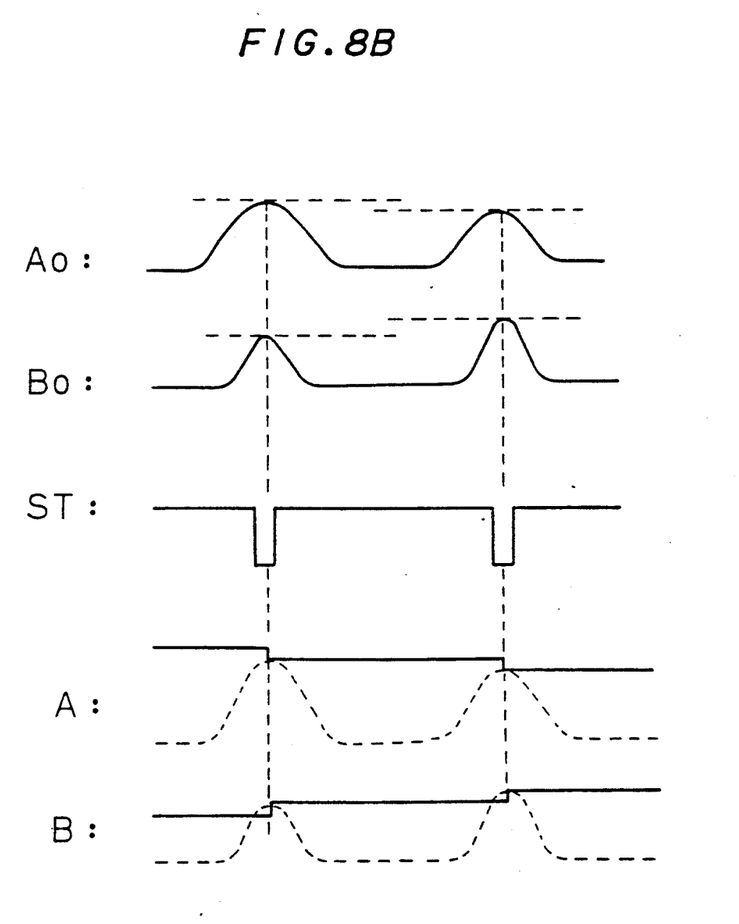

This pulse train ST is supplied to sample-and-hold circuits 55U and 55L as timing control signals. The sample-and-hold circuits 55U and 55L samples the levels of the signals $A_0$ and $B_0$ respectively when the pulse train ST forms a negative peak, and hold the sampled levels until a next negative peak is formed. Thus, respective outputs A and B of the sample-and-hold circuits 55U and 55L become signals expressing previous peak values of the signals $A_0$ and $B_0$ as shown in FIG. 8B, so that values which are not zero can be maintained also when the beam spot BS is passing through the light shielding layer 33. Thus, surface inclination correction of the polygon mirror 9 based on the signals A and B can be continuously performed in time.

The signals A and B are supplied to next stage operational amplifiers 56. The operational amplifier 56 serves as an analog subtracter, and the other operational amplifier 57 serves as an analog adder. Therefore, the operational amplifiers 56 and 57 output a difference signal (A−B) and a sum signal (A+B) respectively. A divider 58 divides the difference signal (A−B) by the sum signal (A+B), to evaluate normalized deviation M as follows:

$$M = (A-B)/(A+B)$$

and generates a beam deviation signal SM expressing the value M, to output the same to the AOD 8. This beam deviation signal SM is adapted to correct surface inclination of the polygon mirror 9 in real time, as already described above.

The control signal for the AOD 8 is formed not by the difference signal (A−B) itself but by the normalized deviation M, whereby the deviation of the beam spot BS from the reference line RF is quantitatively and correctly expressed also when the light intensity of the reference light beam LR which is photoelectrically converted by the photosensor array 100 is not constant. Thus, the surface inclination of the polygon mirror is corrected in high accuracy.

D. Method of Manufacturing Photosensor

Figure 9A:
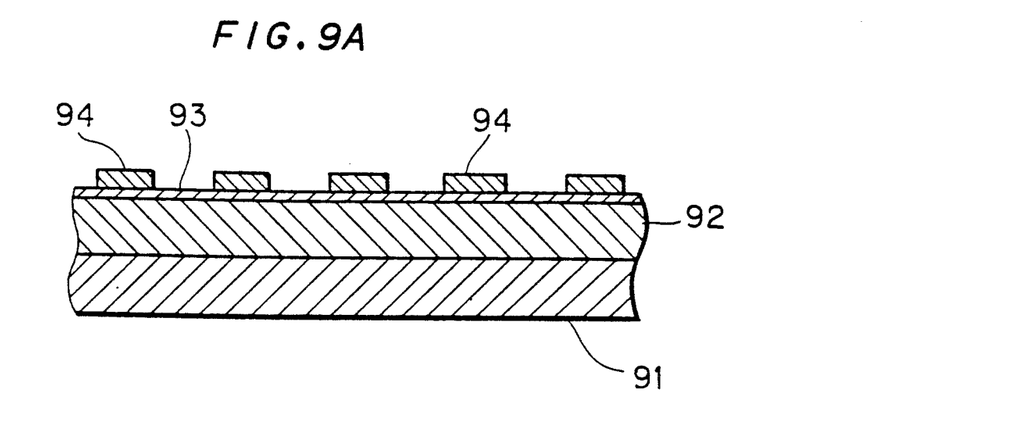
FIGS. 9A to 9C are sectional process diagrams showing a method of manufacturing the photosensor.
Figure 9B:
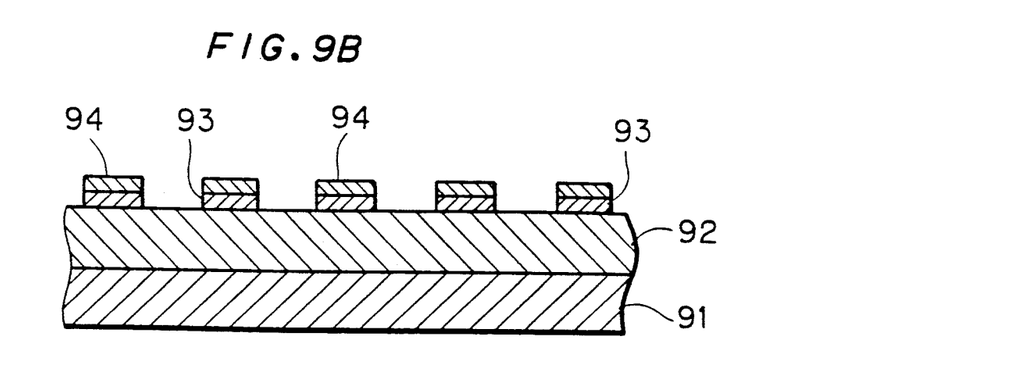
Figure 9C:
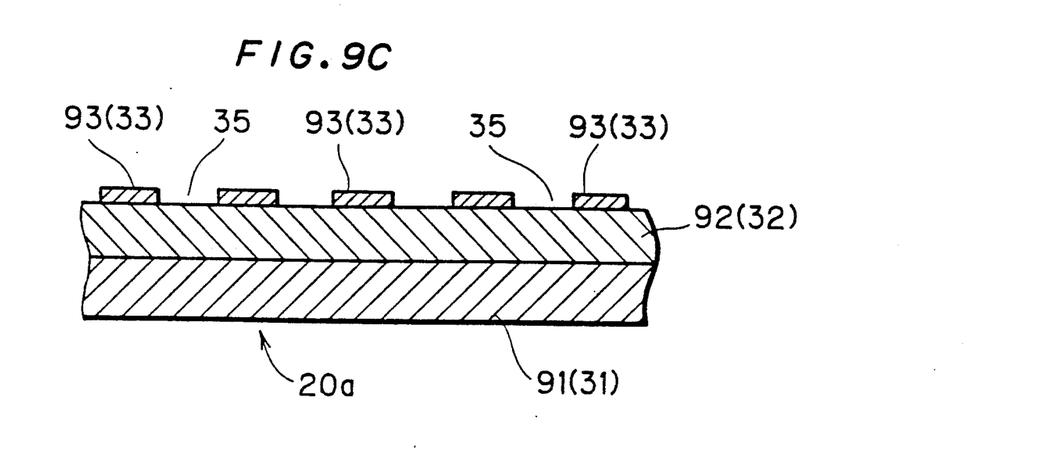

FIGS. 9A to 9C are sectional views, taken along the lines IX—IX in FIG. 1, showing a method of manufacturing the photosensor 20a. The remaining photosensors 20b to 20n are also manufactured by a similar method.

First, a p-type semiconductor wafer 91 (FIG. 9A) is prepared, and an n-type impurity is doped onto its upper major surface, to form an n-type semiconductor layer 92. An aluminum film 93 is formed on the n-type semiconductor layer 92 by vapor deposition, and thereafter a resist layer 94 having a periodic slit pattern is formed thereon.

Then, the aluminum film 93 is selectively etched through the resist layer 94, which serves as a mask (FIG. 9B). When the resist layer 94 is removed, slit-type windows 35 and alternately arrayed unit light shielding layers 33 are obtained (FIG. 9C). In the state shown in FIG. 9C, the wafer is divided in the form of strips as shown in FIG. 1, to obtain the photosensor 20a. The semiconductor substrate 91 and the semiconductor layer 92 after such division are just the semiconductor substrate 31 and the semiconductor layer 32 shown in FIG. 1A, respectively.

E. Supplement and Conclusion

Accuracy for detection of deviation is increased as the distance between the pair of semiconductor layers 32U and 32L is reduced. If the distance is extremely reduced, however, an npn (or pnp) parasitic transistor is undesirably formed by the semiconductor layers 32U and 32L, serving as a collector and an emitter, and a portion of the semiconductor substrate 31, which is held between the semiconductor layers 32U and 32L, serving as a base. Thus, the aforementioned distance is preferably about 0.01 mm, for example. The grating pitch 2W is preferably about 0.8 mm, for example.

In addition to an image reading or recording apparatus having a polygon mirror as a main deflector, the photosensor according to the present invention is also applicable to an image reading or recording apparatus employing a galvano mirror, a hologram disk or the like as a main deflector. In the case of image reading, an original surface is scanned with a main light beam so that its transmitted or reflected light is received by the photosensor, while timing for taking the photoreceptor signal in an image memory or the like is controlled by the main scanning synchronizing clock CKX. A method of correcting surface inclination etc. itself is similar to that in image recording. The reference light beam LR may be emitted from a light source which is different from that for the main light beam LM.

As hereinabove described, two p-n junctions are formed on a common semiconductor layer in a parallel manner and a positional relation therebetween is fixed, whereby no assembled position control of high accuracy is required when the photosensor according to the present invention is assembled into given apparatuses.

Further, since the light shielding pattern is formed by array of simple strip-shaped light shielding layers which are directly formed on the sensor body, no grating glass member having a specific light shielding pattern is required. Consequently, it is possible to reduce the manufacturing cost.

Further, in an image scanner according to the present invention, a photosensor array formed by arraying the aforementioned photosensor arrays along its longitudinal direction is employed, whereby the image scanner effectuates the aforementioned respective advantages.

Although the present invention has been described and illustrated in detail, it is clearly understood that the same is by way of illustration and example only and is not to be taken by way of limitation. The spirit and scope of the present invention should be limited only by the terms of the appended claims.

I claim:

1. A photosensor employable for detecting a scanning position of a light beam, comprising:
    (a) a first conductivity type first semiconductor layer having a major surface defined by first and second directions and extending along said first direction in the form of a strip, wherein said first direction corresponds to a scanning direction of said light beam and said second direction is perpendicular to said first direction;
    (b) a pair of second conductivity type second semiconductor layers formed in said major surface along said first direction in the form of strips respectively, and being adjacent to each other in said second direction; and
    (c) a light shielding pattern provided on said major surface and comprising unit light-shielding layers each of which is strip-shaped and extends along said second direction and which are periodically arranged along said first direction with gaps therebetween and selectively cover said pair of second semiconductor layers;
    wherein first and second photoelectric conversion signals indicating said scanning position of said light beam are obtained from first and second p-n junctions defined between said first semiconductor layer and respective ones of said pair of second semiconductor layers when said major surface is scanned by said light beam.

2. The photosensor of claim 1, wherein
    each of said gaps has a same width as each of said unit light-shielding layers in said first direction.

3. The photosensor of claim 2, wherein
    said width is substantially equal to a diameter of said light beam on said major surface.

4. The photosensor of claim 3, wherein
    said light shielding pattern further comprises additional light-shielding layers provided on opposite end areas of said major surface and extending along said second direction with gaps between said unit light-shielding layers and said additional light-shielding layers to selectively cover respective ends of said pair of second semiconductor layers, said additional light-shielding layers having a width smaller than said width of each unit light-shielding layer.

5. The photosensor of claim 1, wherein
    said light shielding pattern is made of metal.

6. A photosensor array employable for detecting a scanning position of a light beam, comprising:
    (a) an elongated base plate extending in a first direction corresponds to a scanning direction of said light beam;
    (b) a plurality of photosensors aligned on said base plate in said first direction, each of said photosensors comprising:
        (b-1) a first conductivity type first semiconductor layer having a major surface defined by said first direction and a second direction perpendicular to said first direction and extending along said first direction in the form of a strip;
        (b-2) a pair of second conductivity type second semiconductor layers formed in said major surface along said first direction in the form of strips respectively, and being adjacent to each other in said second direction; and
        (b-3) a light shielding pattern provided on said major surface and comprising unit light-shielding layers each of which is strip-shaped and extends along said second direction and which are periodically arranged along said first direction with gaps therebetween and selectively cover said pair of second semiconductor layers;
        wherein
            first and second p-n junctions are defined between said first semiconductor layer and respective ones of said pair of second semiconductor layers; and
            first and second photoelectric conversion signals are obtained from said first and second p-n junctions when said light beam is received by said photosensor array;
    (c) means for electrically summing up respective first photoelectric conversion signals obtained in said photosensors to generate a first composite signal; and
    (d) means for electrically summing up respective second photoelectric conversion signals obtained in said photosensors to generate a second composite signal;
    wherein a scanning position of said light beam on said photosensor array is indicated by a combination of said first and second composite signals.

7. The photosensor array of claim 6, wherein
    each of said gaps has a same width as each of said unit light-shielding layers in said first direction.

8. The photosensor array of claim 7, wherein
    said width is substantially equal to a diameter of said light beam on said major surface.

9. The photosensor array of claim 8, wherein
    said light shielding pattern further comprises additional light-shielding layers provided on opposite end areas of said major surface and extending along said second direction with gaps between said unit light-shielding layers and said additional light-shielding layers to selectively cover respective ends of said pair of second semiconductor layers, said additional light-shielding layers having a width smaller than said width of said unit light-shielding layers.

10. The photosensor array of claim 9, wherein
    said photosensors are aligned in said first direction with alignment gaps therebetween, each of said alignment gaps is such that the following equation holds:

$$2W_a + G = W$$

where:
    $W_a$ is said width of each additional light-shielding layer,
    G is a value representing each of said alignment gaps, and
    W is said width of each unit light-shielding pattern.

11. An image scanner for periodically scanning an object surface with a main light beam in a prescribed main scanning direction and relatively moving said scanned surface and said main light beam along a sub-scanning direction, thereby performing image recording on said object surface or image reading from said object surface, said image scanner comprising:

(a) light beam emission means for emitting said main light beam while emitting a reference light beam being parallel to said main light beam;

(b) a predeflector interposed in optical paths of said main and reference light beams for deflecting said main and reference light beams in a pre-deflecting direction being conjugate with said subscanning direction in response to a control signal;

(c) a main deflector for receiving said main and reference light beams after deflected by said predeflector and for periodically deflecting said main and reference light beams in a main deflecting direction being conjugate with said main scanning direction;

(d) means for relatively changing respective travelling directions of said main and reference light beams after deflected by said main deflector, thereby guiding only said main light beam onto said scanned surface;

(e) a photosensor array formed by linearly arraying photosensors in a first direction conjugate with said main deflecting direction and located at a position capable of receiving said reference light beam, each of said photosensors comprising:

(e-1) a first conductivity type first semiconductor layer extending along said first direction in the form of a strip, wherein said first semiconductor layer has a major surface defined by said first direction and a second direction perpendicular to said first direction;

(e-2) a pair of second conductivity type second semiconductor layers formed in said major surface along said first direction in the form of strips respectively; and being adjacent to each other in said second direction; and (e-3) a light shielding pattern provided on said major surface and comprising unit light-shielding layers each of which is strip-shaped and extends along said second direction and which are periodically arranged along said first direction with gaps therebetween and selectively cover said pair of second semiconductor layers, wherein first and second p-n junctions are defined between said first semiconductor layer and respective ones of said pair of second semiconductor layers; and first and second photoelectric conversion signals are obtained from said first and second p-n junctions when said reference light beam is received by said photosensor array;

(f) means for summing up respective first photoelectric conversion signals obtained in said photosensors to generate a first composite signal;

(g) means for summing up respective second photoelectric conversion signals obtained in said photosensors to generate a second composite signal; and (h) a feedback loop means for receiving said first and second composite signals to generate;

a feedback signal responsive to difference between said first and second composite signals, in which said feedback signal is delivered to said predeflector as said control signal; and a timing signal for determining a timing of image recording or image reading with said main light beam on said object surface.

12. The image scanner of claim 11, wherein
each of said gaps has a same width as each of said unit light-shielding layers in said first direction.

13. The image scanner of claim 12, wherein
said width is substantially equal to a diameter of said main light beam on said major surface.

14. The image scanner of claim 13, wherein
said light shielding pattern further comprises additional light-shielding layers provided on opposite end areas of said major surface and extending along said second direction with gaps between said unit light-shielding layers and said additional light-shielding layers to selectively cover respective ends of said pair of second semiconductor layers, said additional light-shielding layers has a width smaller than said width of said unit light-shielding layers.

15. The image scanner of claim 14, wherein
said photosensors are aligned in said first direction with alignment gaps therebetween, each of said alignment gaps is such that the following equation holds:

$$2W_a + G = W$$

where:
$W_a$ is said width of each additional light-shielding layer,
G is a value representing each of said alignment gaps, and
W is said width of each unit light-shielding pattern.

16. The image scanner of claim 15, wherein
said feedback loop means comprises:

(h-1) means for binarizing said first and second composite signals to obtain first and second binary signals; and (h-2) means for obtaining a logical sum of said first and second binary signals to generate said timing signal.

17. The image scanner of claim 16, wherein
said feedback loop means further comprises:

(h-3) means for sampling and holding respective peak levels of said first and second composite signals in synchronism with said timing signal to obtain first and second electric signals, respectively, from which said feedback signal is obtained;

18. The image scanner of claim 17, wherein
said feedback loop means further comprises:

(h-4) means for calculating a difference between said first and second electric signals to obtain a difference signal;

(h-5) means for calculating a sum of said first and second electric signals to obtain a sum signal; and (h-6) means for dividing said difference signal by said sum signal to generate said feedback signal.

* * * * *